(12) United States Patent
Hu et al.

(10) Patent No.: US 8,750,308 B2
(45) Date of Patent: Jun. 10, 2014

(54) COMMUNICATION METHOD AND SERVER OF TRANSMISSION CONTROL PROTOCOL

(75) Inventors: Jian Qiang Hu, Hangzhou (CN); Hao Dong, Hangzhou (CN); Li Huang, Hangzhou (CN); Dong Fang Ji, Hangzhou (CN); Guang Xue Li, Hangzhou (CN); Qing Ren, Hangzhou (CN); Feng Shi, Hangzhou (CN); Ke Tang, Hangzhou (CN); Yang Sheng Xiao, Hangzhou (CN); Ming Hua Zhao, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 13/380,001

(22) PCT Filed: Oct. 14, 2011

(86) PCT No.: PCT/US2011/056430
§ 371 (c)(1),
(2), (4) Date: Dec. 21, 2011

(87) PCT Pub. No.: WO2012/054347
PCT Pub. Date: Apr. 26, 2012

(65) Prior Publication Data
US 2013/0195108 A1  Aug. 1, 2013

(30) Foreign Application Priority Data

Oct. 19, 2010  (CN) .......................... 2010 1 0515928

(51) Int. Cl.
*H04B 3/20* (2006.01)
(52) U.S. Cl.
USPC ........................... 370/392; 370/312; 370/412

(58) Field of Classification Search
USPC ................. 370/392–412, 312, 331–349, 254; 455/424, 575
See application file for complete search history.

(56) References Cited

U.S. PATENT DOCUMENTS

| 6,519,263 | B1 | 2/2003 | Huth |
| 6,757,277 | B1 | 6/2004 | Shaffer et al. |
| 2002/0078135 | A1 | 6/2002 | Venkatsubra |
| 2002/0174208 | A1 | 11/2002 | Morlitz |
| 2005/0259633 | A1 | 11/2005 | Kato |

(Continued)

OTHER PUBLICATIONS

The PCT Search Report and Written Opinion mailed Feb. 29, 2012 for PCT application No. PCT/US11/56430, 8 pages.

(Continued)

*Primary Examiner* — Ricky Ngo
*Assistant Examiner* — Iqbal Zaidi
(74) *Attorney, Agent, or Firm* — Lee & Hayes, PLLC

(57) ABSTRACT

This disclosure provides methods and servers to transmit data packets via Transmission Control Protocol (TCP) connections. In some aspects, transmitting data packets includes receiving a data packet from a first application on a first server. The data packet is analyzed to determine a destination address associated with a second server. The data packet is transmitted based on the address associated with the second server. In some aspects, transmitting data packets includes receiving a data packet from a second application on a second server. The data packet is analyzed to determine the destination address associated with a first application on the first server. The data packet is transmitted based on the address associated with the first application. In some aspects, transmitting data packets includes a flow control mechanism to control data transmission.

16 Claims, 10 Drawing Sheets

(56) References Cited

U.S. PATENT DOCUMENTS

| | | |
|---|---|---|
| 2005/0286452 A1 | 12/2005 | Hardgrave et al. |
| 2007/0127513 A1 | 6/2007 | Sudini et al. |
| 2007/0206620 A1* | 9/2007 | Cortes et al. ............... 370/412 |
| 2008/0075096 A1 | 3/2008 | Wagner |
| 2008/0175232 A1* | 7/2008 | Tsai et al. ................... 370/355 |
| 2009/0310495 A1 | 12/2009 | Seta et al. |
| 2009/0328073 A1 | 12/2009 | Tripathi |
| 2010/0023641 A1* | 1/2010 | Asakura ...................... 709/231 |
| 2010/0098092 A1* | 4/2010 | Luo et al. ..................... 370/401 |
| 2011/0270976 A1 | 11/2011 | Yasuda et al. |

OTHER PUBLICATIONS

The Chinese Office Action mailed Dec. 30, 2013 for Chinese patent application No. 2010105159285 a counterpart foreign application of U.S. Appl. No. 13/380,001, 14 pages.

* cited by examiner

COMMUNICATION METHOD AND SERVER OF TRANSMISSION CONTROL PROTOCOL

CROSS REFERENCE TO RELATED PATENT APPLICATIONS

This application is a national stage application of an international application PCT/US11/56430, filed Oct. 14, 2011, which claims priority to Chinese Patent Application No. 201010515928.5, filed on Oct. 19, 2010, entitled "Communication Method and Server of Transmission Control Protocol," which applications are hereby incorporated by reference in their entirety.

TECHNICAL FIELD

The present disclosure relates to network communication technologies. More particularly, the disclosure relates to methods of and servers for Transmission Control Protocol (TCP) communications.

BACKGROUND

During a communication between two parties using Transmission Control Protocol (TCP), a TCP connection is established between these two parties (e.g., a client application and a server application) to bi-directionally transmit data. According to TCP, an IP address and port ID are used to identify a communication party, and the port ID is a 16-digit unsigned integer ranging from 1 to 65535.

To establish a TCP connection between a server application and a client application, the server application first opens a port, and listens on that port. The client application also opens a port and connects with the listening port of the server application via the port. Therefore, establishing a TCP connection requires at least three handshakes between the server application and client application. However, a problem may occur for a large volume of TCP connections established based on conventional technologies. As a result, excessive system resources may be consumed during transmission.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

This disclosure provides methods and servers, for example, to transmit data packets via Transmission Control Protocol (TCP) connections. In some aspects, transmitting data packets includes receiving a data packet from a first application on a first server. The data packet is then analyzed by a first communication proxy on the first server to determine a destination address associated with a second server including a second application that is to receive the data packet. After determination of the address, the data packet is placed in a queue between the first communication proxy and a second communication proxy on the second server, and sent to the second communication proxy.

In some aspects, transmitting data packets includes receiving a data packet from a second application on a second server. The data packet is then analyzed by a first communication proxy on a first server to determine a destination address associated with a first application that is to receive the data packet and is located on the first server. After determination of the address, the data packet is placed in a queue between the first communication proxy and the first application, and sent to the first application. In some aspects, transmitting data packets includes a flow control mechanism to control data transmission.

DETAILED DESCRIPTION

The detailed description of a method of and server for TCP is set forth with reference to the accompanying figures.

Figure 1:
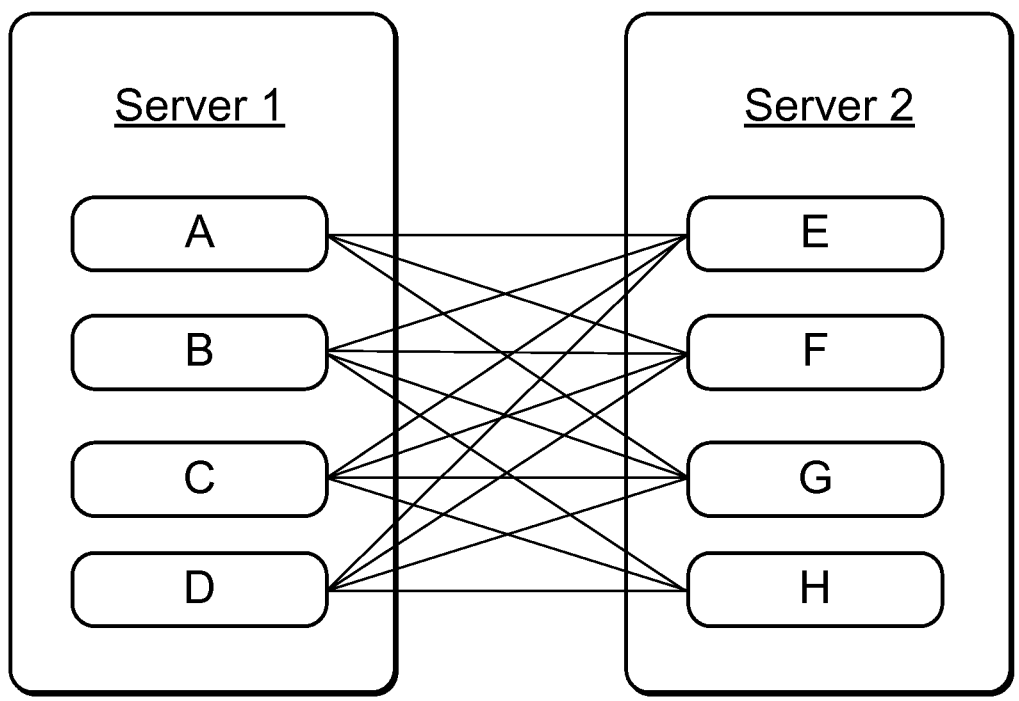
FIG. 1 is a schematic diagram showing exemplary TCP connections between servers.

FIG. 1 is a schematic diagram showing exemplary TCP connections between servers. To perform TCP communications between applications on two servers (e.g. client applications and server applications), TCP connections are generally established between the applications on the two servers. As shown in FIG. 1, each of the applications A-D in the Server 1 establishes a TCP connection with each of the applications E-H in the Server 2.

As long as applications A-D communicate with applications E-H, TCP connections need to be established between the two servers. Suppose that there are two servers and each server runs 100 applications. Since TCP connections need to be established between two individual applications of the two servers, there would be a total of 10,000 TCP connections between the two servers. From operating system and protocol stack standpoints, maintaining this many TCP connections would consume a large amount of system resources. To avoid this situation, one proposed solution is to immediately close TCP connections after applications finish their uses and re-establish the TCP connections if the applications again need connections. A process of re-establishing connections requires at least three handshakes, and therefore may causes delays in running of the applications.

This may even cause a bigger problem for a large-scale server cluster. Suppose that the cluster has 5000 servers, and each server, on average, runs 100 applications. As a result, the cluster may establish 500,000 TCP connections in total. Maintaining this many TCP connections would consume a large amount of system resources. Moreover, even if not all of these TCP connections are concurrently maintained, running of these applications would be delayed because of the process of closing and/or opening these TCP connections.

As discussed above, conventional technologies establish a TCP connection for every application that communicates with another application between different servers, and may cause delays in running of these applications. This disclosure describes various exemplary ways to improve TCP communications and to avoid the aforementioned problems.

Figure 2:
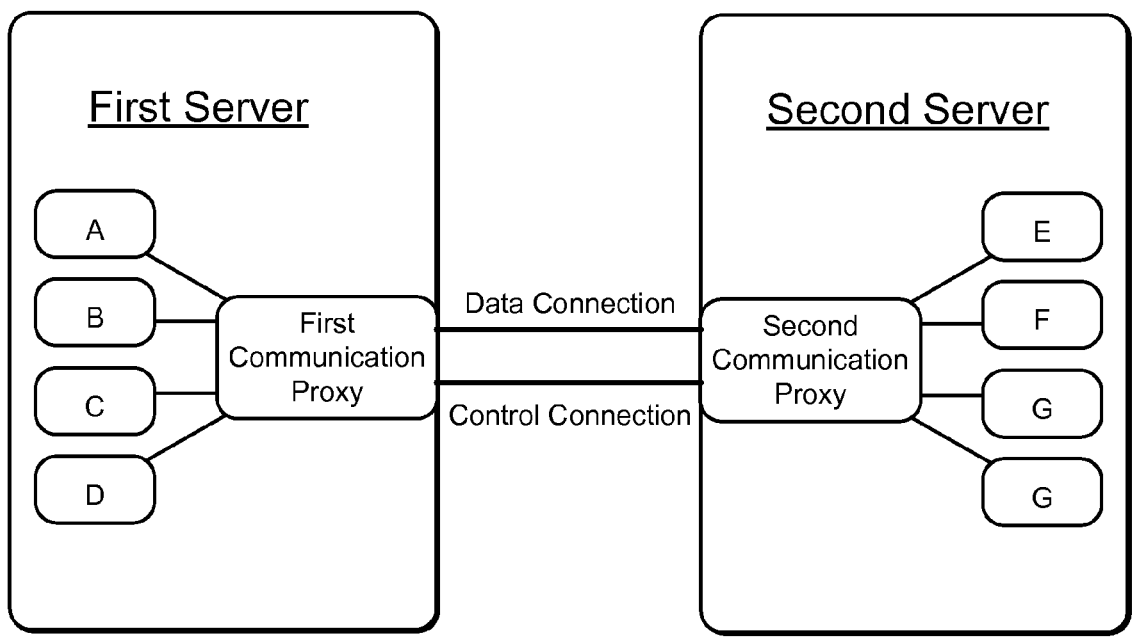
FIG. 2 is a schematic diagram showing exemplary TCP connections between servers.

FIG. 2 is a schematic diagram showing exemplary TCP connections between servers. As shown, a first communication proxy and a second communication proxy are respectively installed in a first server and a second server, on which two communication parties (i.e., first applications A-D and second applications E-H) are located. The first communication proxy and the second communication proxy are software modules that perform specific functions.

The first applications A-D on the first server connect with the first communication proxy via inter-process communication connections. Similarly, the second applications E-H on the second server connect with the second communication proxy via inter-process communication connections. These inter-process communication connections may use one of the several inter-process communication methods provided by the servers' operating system. By way of example and not limitation, the communication methods may include Unix Domain Socket, Local TCP, Shared Memory and Message Queue, and Pipe.

The first communication proxy in the first server and the second communication proxy in the second server use a pre-established data connection, which is different from the conventional TCP technology that establishes a TCP connection between the two applications. The data connection provided by this disclosure is a fixed and highly stable connection. Through the connection, every application in the first server may connect to an application in the second server via a TCP connection established between the first communication proxy and second communication proxy. In turn, every application in the second server may connect to an application in the first server via the TCP. As shown in FIG. 2, the data connection between the first communication proxy and second communication proxy provides a data communication channel between the first applications in the first server and the second applications in the second server. The data connection actually replaces several TCP connections that would have been established among many TCP communication parties under conventional technologies. In some embodiments, a single established data connection may implement the data transfer between the first applications in the first server and the second applications in the second server. Because there is no direct connection between the first applications and the second applications, actual connection volume is much less than that under conventional technologies, and therefore system resources can be greatly saved.

In some embodiments, for large-scale clustered applications, there may be many servers similar to the first server and second server shown in FIG. 2. The communication proxy in each server of a server cluster may separately connect with the communication proxy in another server of the server cluster via a data connection.

In some embodiments, an application in a first server (thereafter "first application") sends a data packet to a first communication proxy in the first server. This first communication proxy sends the data packet to a second communication proxy in the second server. Then, the second communication proxy sends the data packet to another application in the second server (thereafter "second application").

In some embodiments, the second application sends the data packet to the second communication proxy in the second server. This second communication proxy sends the data packet to the first communication proxy in the first server. Then, the first communication proxy sends the data packet to the first application.

In some embodiments, the first communication proxy in the first server and the second communication proxy in the second server are opposite ends in a TCP connection, and their network status is therefore symmetrical. The first application sends the data packet to the first communication proxy, and then the first communication proxy sends the data packet to the second communication proxy. This process is similar to the process in which the second application sends the data packet to the second communication proxy, and then the second communication proxy sends the data packet to the first communication proxy. Similarly, the second communication proxy sends the received data packet to the second application. This process is also similar to the process in which the first communication proxy sends the received data packet to the first application.

In some embodiments, the first communication proxy transmits the received data packet from the first application to the second communication proxy. The first communication proxy receives from the second communication proxy the data packet sent by the second application. Then, the first communication proxy sends it to the first application. It is to be appreciated that bidirectional TCP communications can be implemented based on this disclosure. The bidirectional TCP communications may be established either from the first communication proxy to the second communication proxy or from the second communication proxy to the first communication proxy.

Figure 3:
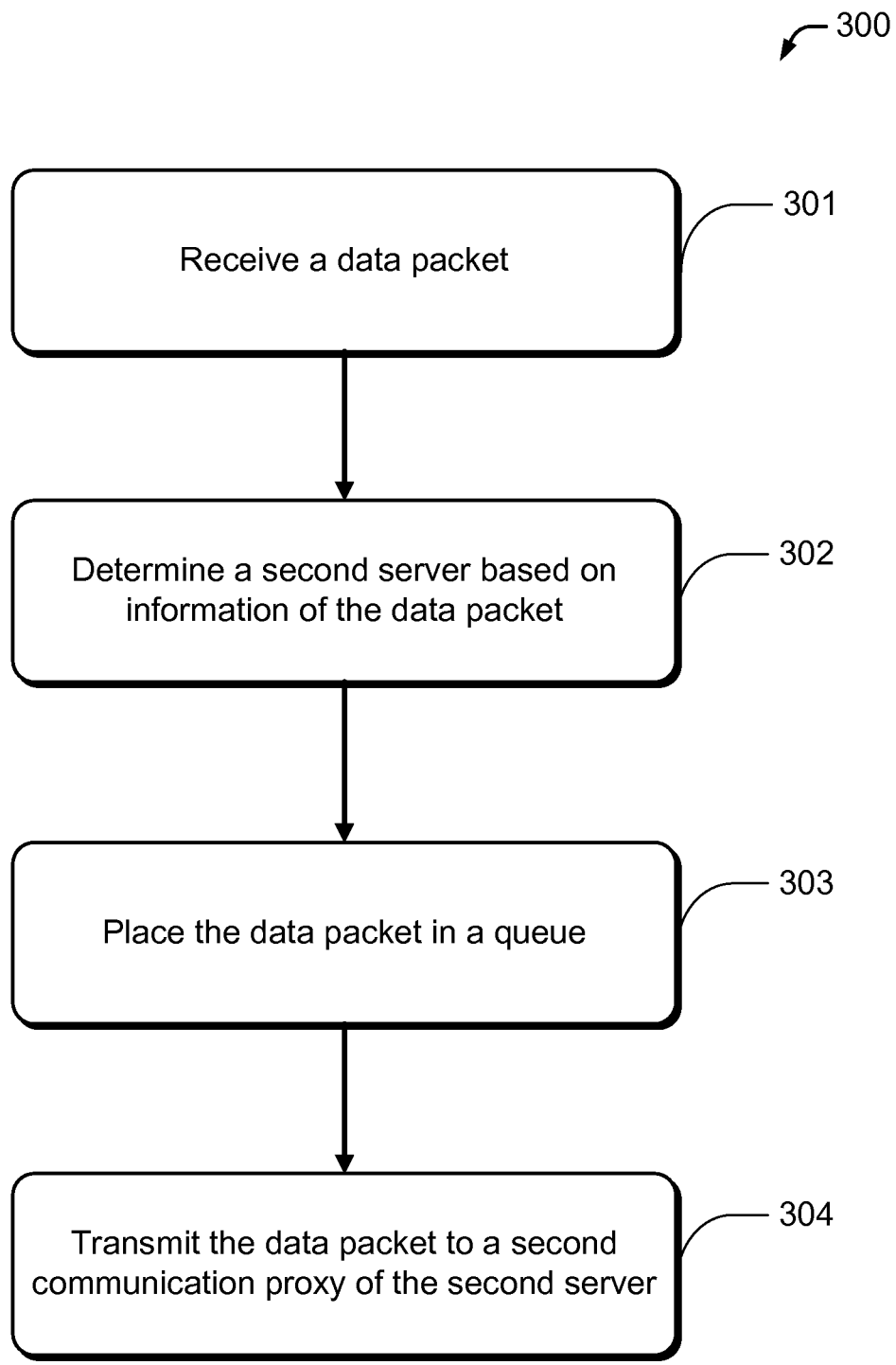
FIG. 3 is a flowchart showing an exemplary process of transmitting a data packet from a first application on a first server to a second communication proxy on a second server.

FIG. 3 is a flowchart showing an exemplary process of transmitting a data packet from a first application on a first server to a second communication proxy in a second server.

At block 301, the first server's first communication proxy receives the data packet sent by the first application on the first server via a pre-established inter-process communication connection between the first communication proxy and the first application. At block 302, the first communication proxy analyzes the data packet to determine a destination address of the second server where a second application that is to receive the data packet is located. At block 303, the first communication proxy places the data packet in a queue of the first server. The queue corresponds to the second application on the second server. At block 304, the first communication proxy retrieves the data packet from the queue, and then sends the data packet to the second communication proxy via the pre-established data connection between the first communication proxy and the second communication proxy.

Figure 4:
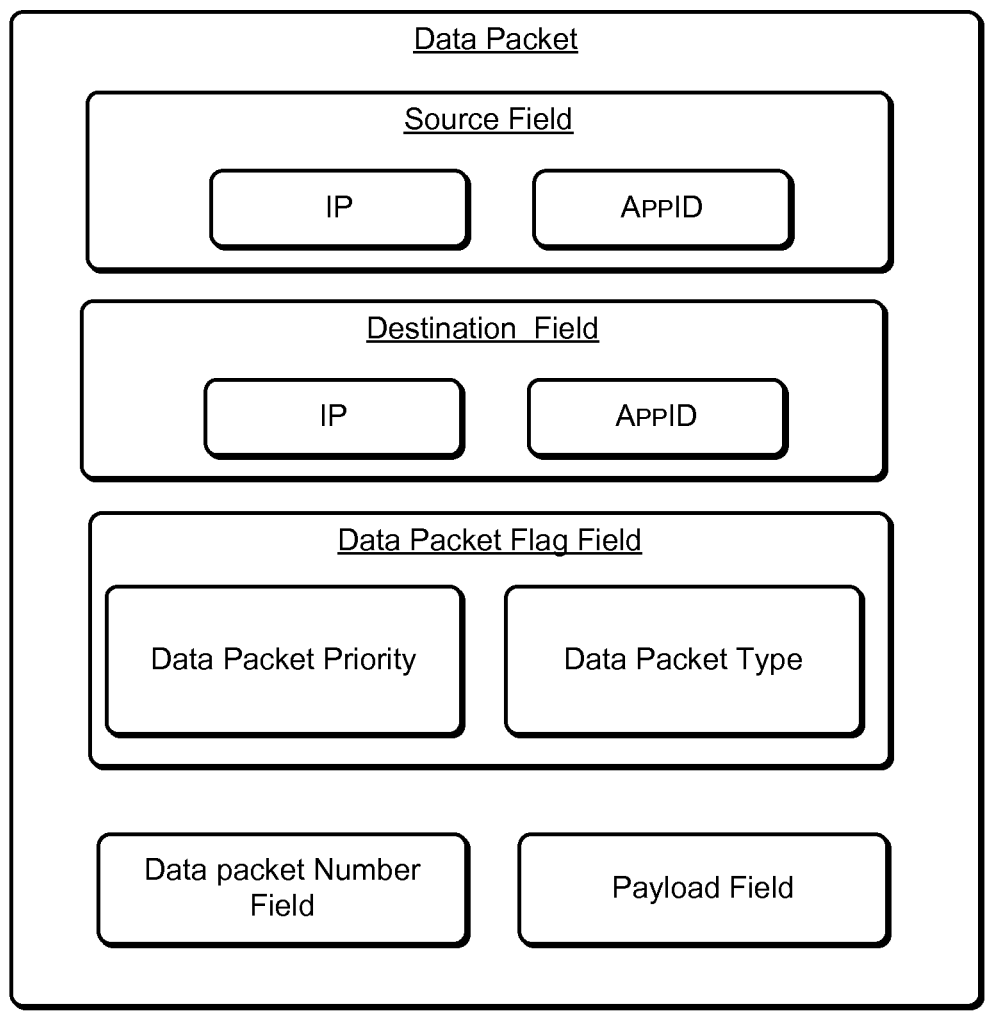
FIG. 4 is a schematic block diagram of an illustrative data packet format.

FIG. 4 is a schematic of an illustrative data packet format. While applications of a first server use its inter-process communication connection to send a data packet within the first server, they send the data packet to a second communication proxy on a second server via a data connection. Also, the second communication proxy can distinguish the inter-process communication connection corresponding to each data packet based on its destination address, and therefore accurately transmit the data packet to corresponding second applications on the second server. In some embodiments, different applications in a server may be distinguished based on a corresponding unique application ID (thereafter "AppID") (e.g., a 16-bit integer). For example, each application on the first server and on the second server is assigned an AppID. In some embodiments, combining with an IP address, an AppID can be used to locate an application. In other words, a two-tuple (i.e., IP, AppID) may represent an address of an application on a server.

As illustrated in FIG. 4, in some embodiments, a data packet may include: a SRC field (i.e., a source address), a DST field (i.e., a destination address), and a payload field. In these embodiments, the SRC field represents the source address that includes a (IP, AppID) of a first application that sends the data packet. The DST field represents a destination address that includes a (IP, AppID) of a second application that receives the data packet. The data packet may include, for example, a data packet number field and a data packet flag field. The data packet flag field may include, for example, data packet priority and a type of the data packet (e.g., data news). Therefore, when the first communication proxy analyzes the destination address in the data packet, the communication proxy can determine the corresponding second communication proxy of the second application that is to receive the data packet. The first communication proxy then sends the data packet to the second communication proxy. Once the second communication proxy receives the data packet, it can send the data packet to the corresponding second application based on the destination address included in the data packet.

Figure 5:
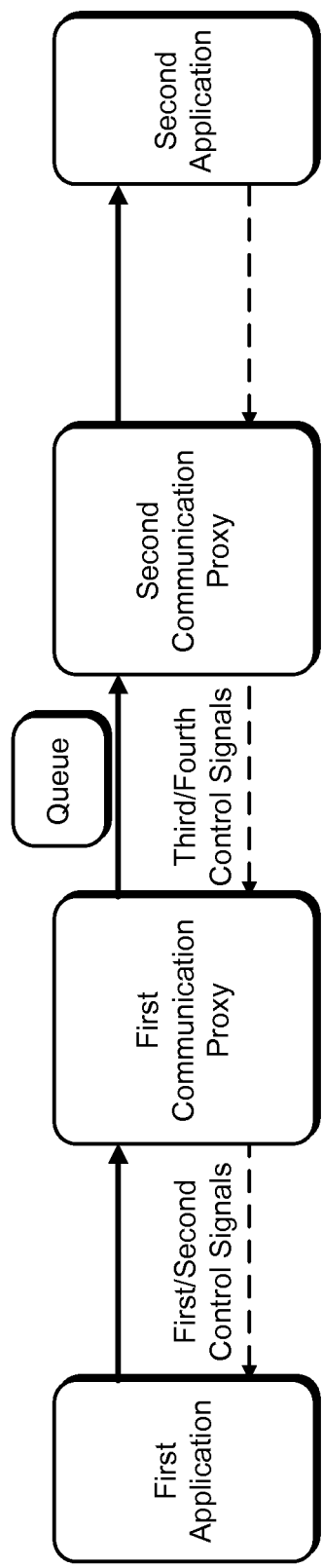
FIG. 5 is a schematic diagram showing an exemplary process of sending a data packet from a first communication proxy of a first server to a second communication proxy of a second server.

FIG. 5 is a schematic diagram showing an exemplary process of sending a data packet from a first communication proxy of a first server to a second communication proxy of a second server (e.g., blocks 303 and 304 of FIG. 3). As illustrated FIG. 5, once the first communication proxy receives the data packet sent by a first application of the first server, the first communication proxy may determine whether a queue has been established between the first communication proxy and the second communication proxy. The queue corresponds to the second application that receives the data packet, and is used to send the data packet to the second communication proxy. In some embodiments, the first communication proxy determines that the queue has not been established. Then, the queue is established, and the data packet is placed in the queue. By way of example and not limitation, the data packet may be placed in the queue based on an order of timestamps of placing in the queue or priority of the data packet. Since the queue corresponds to the second application that is to receive the data packet, the first communication proxy may determine the second application using the destination address included in the data packet, and determine the queue in which the data packet should be placed.

In some embodiments, the first communication proxy may retrieve the data packet from the queue if the data connection falls within bandwidth requirements. By way of example and not limitation, the data packet may be retrieved based on a first-in-first-out technique or priority of the data packets. The retrieved data packet may be transmitted to the second communication proxy via the data connection between the first communication proxy and the second communication proxy.

In some embodiments, while a certain receiving side of a data packet (e.g., a second communication proxy and a second application) slows down its receiving data, the data connection, as a whole, is not to be slowed down because other sides do not slow down their receiving of data. If a first application in the first server generates a large volume of data packets, it may create a situation that the queue is completely filled and the data packets are therefore overflowing. If such situation occurs, the succeeding data packets in the queue cannot be normally transmitted. To avoid similar situations, a flow control mechanism is provided in this disclosure.

In some embodiments, the flow control mechanism may include a control connection established between the first communication proxy in the first server and the second communication proxy in the second server. This control connection is similar to the previously discussed data connection, which is a fixed and stable connection. In this situation, the control connection controls flow control signals while the data connection controls data transmission. This control connection is different from a TCP connection established between the two parties under conventional TCP technologies. This data connection provided by this disclosure further decreases the number of the TCP connections while being a little less effective with respect to flow control, compared to two data connections.

As illustrated in FIG. 5, when transmitting the data packets to the second communication proxy, the first communication proxy monitors a volume of data packets in the queue. In some embodiments, to avoid data overflow in the queue, a control signal (i.e., first control signal) is sent to the first application to stop transmitting the data packet after the first communication proxy determines that the volume of the data packets in the queue is greater than a preset threshold.

In some embodiments, after the first application receives the first control signal, it stops transmitting the data packet to the first communication proxy. The first communication proxy continues to transmit the data packets that are in the queue, and then the volume of data packets in the queue gradually falls. After sending the first control signal to the first application, the first communication proxy monitors the volume of the data packets in the queue. A second control signal (i.e., second control signal) is sent to the first application to resume transmitting the data packet after the first communication determines that the volume of the data packets in the queue falls within a preset threshold.

For example, when the first communication proxy monitors that the data packets in the queue are greater than or equal to ⅔ of the length of the queue (i.e., the total number of data packets that can be received), it sends a signal message XOFF (i.e., first control signal) to stop transmitting the data packet. When the first communication proxy monitors that the volume of the data packets in the queue is less than or equal to ⅓ of the length of the queue, it sends a signal message XON (i.e., second control signal) to resume transmitting the data packet.

In some embodiments, when the first communication proxy transmits the data packets to the second communication proxy, the first communication proxy determines whether the third control signal from the second communication proxy to stop transmitting data packets is received via a pre-established control connection between the first communication proxy and second communication proxy. Upon receiving the third control signal, the first communication proxy temporarily stops transmitting, for example, all the data packets in the queue. After the first communication proxy temporarily stops transmitting all the data packets in the queue, it continues by determining whether a fourth control signal from the second communication proxy to resume transmitting data packets is received in the pre-established control connection. Upon receiving the fourth control signal, the first communication proxy resumes transmitting, for example, all the data packets in the queue.

By way of example and not limitation, the first, the second, the third and the fourth control signals may use data formats similar to that of the data packet used in transmitting data or other formats. For example, control signals may include a data packet type field indicating that a data packet is a control signal.

In some embodiments, when two connections are established, a control signal queue method may be used to transmit control signals in the control connection. The control signal queue is solely used to transmit control signals to ensure that the control signal has a higher transmission priority than data transmissions. The first communication proxy or the second communication proxy can place control signals in a control signal queue. When transmission criteria (e.g., bandwidth requirements) are satisfied, the first communication proxy or the second communication proxy determines whether the control queue contains control signals. If the control queue contains control signals, the control queue is prioritized to be transmitted. This control signal queue ensures that the control signals can reach their destinations on time.

Figure 6:
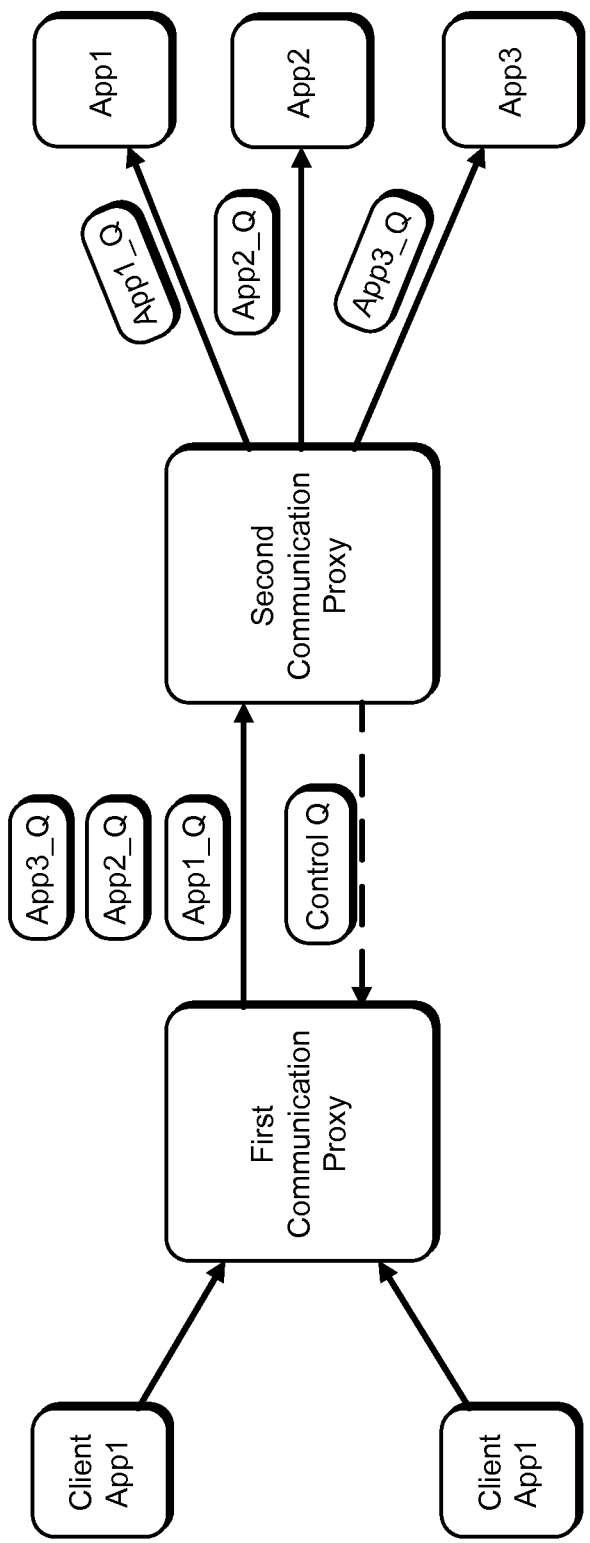
FIG. 6 is a schematic diagram showing an exemplary process of sending several data packets of a queue and of sending control signals.

FIG. 6 is a schematic diagram showing an exemplary process of sending several data packets of a queue and sending control signals of a control signal queue. As illustrated in FIG. 6, the volume in the queue and second queue are determined based on the volume in the second application of the receiving side. Suppose that the second communication proxy connects to three second applications (i.e., App1, App2 and App3 in FIG. 6). Further suppose that the first communication proxy connects to two first applications (i.e., client App1 and client App1). As a result, the first communication proxy receives data packets sent by client App1 and client App2. The first communication proxy, based on the data packets' destination addresses, separately place these data packets in three first queues (i.e., App1_Q, App2_Q and App3_Q in FIG. 6) that correspond to App1, App2 and App3, respectively. Then, the first communication proxy transmits the data packets in the three first queues to the second communication proxy. Once the second communication proxy receives the data packets, it places them in the three second queues (App1_Q, App2_Q and App3_Q) that correspond to the App1, App2 and App3 respectively. These three second applications respectively retrieve their own data packets from the three second queues.

In some embodiments, when executing the above-mentioned blocks 301 to 304, if the first communication proxy detects that a first application in the first server is terminated, the first communication proxy may send a broadcast message, indicating that the first application is terminated, to all second communication proxies that have established data connections with the first communication proxy. Correspondingly, each second communication proxy that receives the broadcast message will transmit the message to all the second applications. Therefore, the first communication proxy does not have to record a state of each first application. In some embodiments, to reduce the data volume of broadcast messages, the first communication may send broadcast messages periodically (e.g., every week). Correspondingly, when a first application is determined, space occupied in the data connection by its corresponding queue can also be released to avoid wasting resources.

Figure 7:
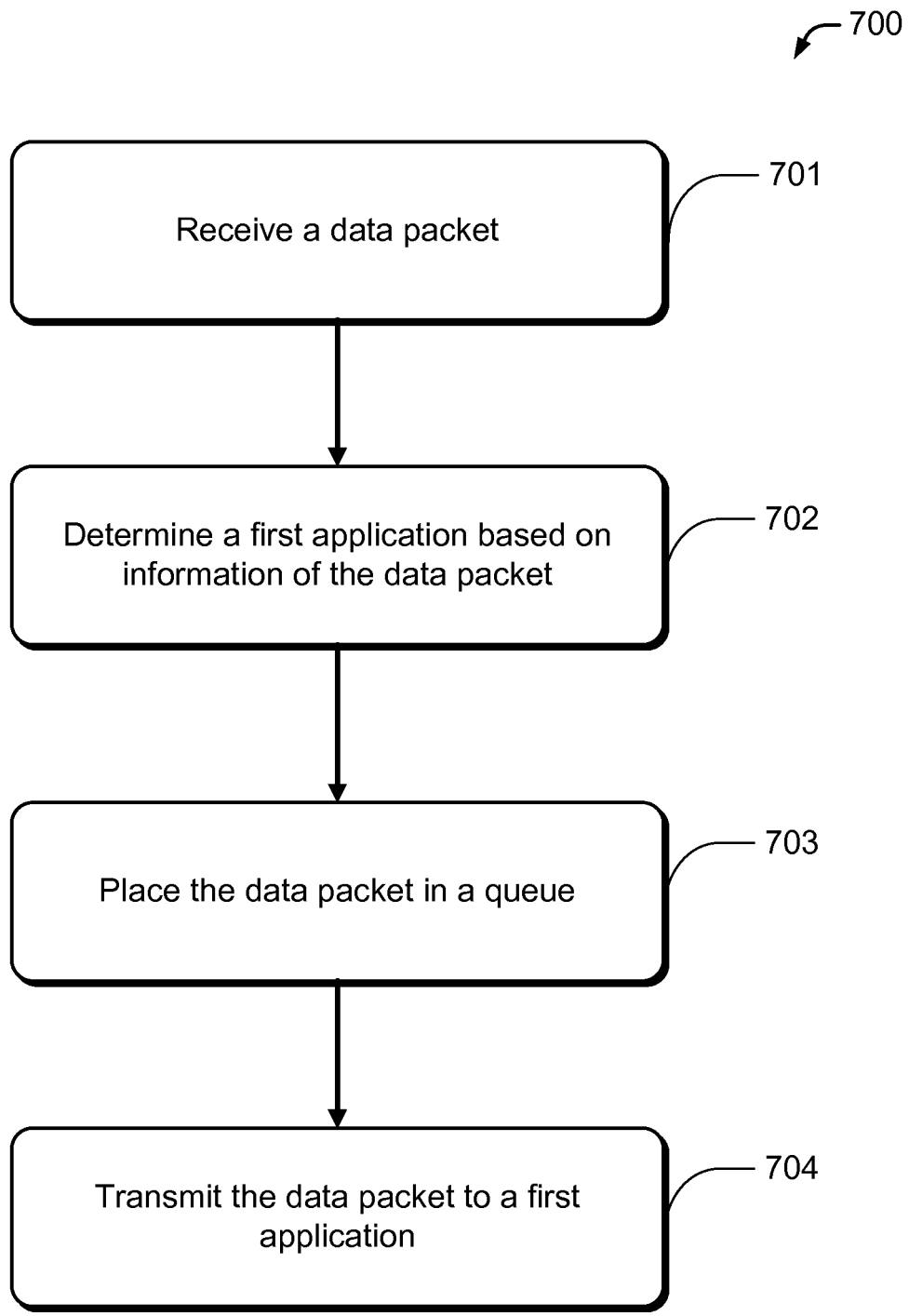
FIG. 7 is a flowchart showing exemplary process of transmitting a data packet from a first communication proxy to a first application on a first server.

FIG. 7 is a flowchart showing an exemplary process of transmitting a data packet from a first communication proxy to a first application in a first server. At block 701, the first communication proxy in the first server receives the second communication proxy's transmitted data packet sent by a second application in the second server via a pre-established data connection between the first communication proxy and the second communication proxy in the second server.

At block 702, the first communication proxy analyzes the data packet's destination address. Based on the destination address, the first communication proxy determines the first application on the first server that is to receive the data packet. In some embodiments, the data packet may include a two-tuple (i.e., IP, AppID) as described above in FIG. 4. For example, the first communication proxy may determine the address of the first application based on its AppID included in the data packet.

At block 703, the first communication proxy places the received data packet in a second queue between the first communication proxy and the first application. At block 704, the first communication proxy sends the data packet to the first application via the pre-established inter-process communication connection between the first communication proxy and the first application. In some embodiments, the first communication proxy may transmit the data packet sent to the first application via a pre-established inter-process communication connection between the first communication proxy and the first application.

Figure 8:
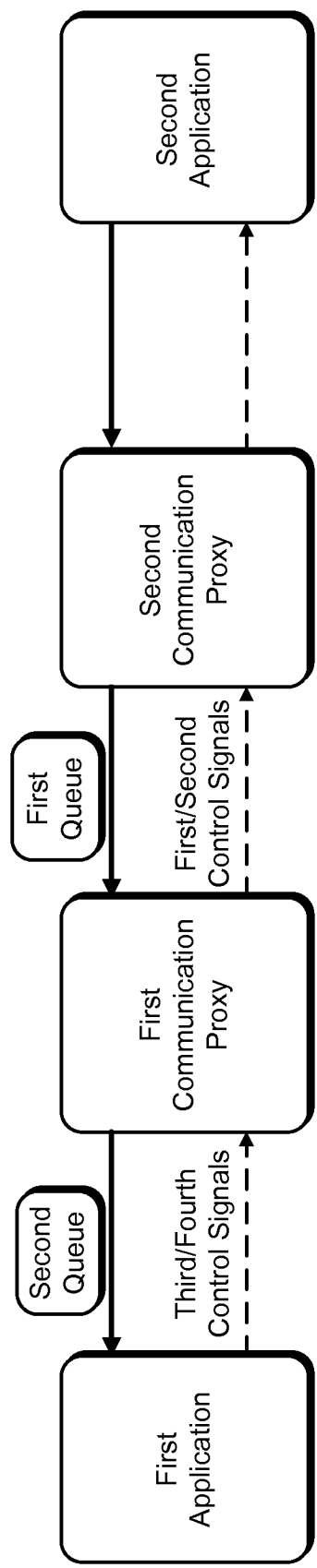
FIG. 8 is a schematic diagram showing an exemplary process of sending a data packet from a first communication proxy on a first server to a first application on a first server.

FIG. 8 is a schematic showing an exemplary process of sending a data packet from a first communication proxy on a first server to a first application on a second server (e.g., blocks 703 and 704 of FIG. 7). As illustrated in FIG. 8, once the first communication proxy receives the data packet, the first communication proxy may determine whether an inter-process communication connection is established between the first communication proxy and the first application that receives the data packet. In some embodiments, the first communication proxy determines that connection is established. Then, the first communication proxy may place the data packet in a second queue between the first communication proxy and the first application. In some embodiments, the first communication determines that the connection is not established. Then, the second queue is established first between the first communication proxy and the first application that receives the data packet. The first communication proxy then places the data packet in the second queue. By way of example and not limitation, the data packet may be placed in the queue based on an order of timestamps of placing in the queue or priority of the data packet. In some embodiments, the second queue may only correspond to the actual first application that receives the data packet.

In some embodiments, the first communication proxy may retrieve the data packet from the queue if falling within bandwidth requirements of a data connection. By way of example and not limitation, the data packet may be retrieved based on a first-in-first-out technique or priority of the data packets. The retrieved data packet may be transmitted to the first application via an inter-process communication connection between the first communication proxy and the first application.

As illustrated in FIG. 8, when transmitting the data packets to the first application (e.g., blocks 703 and 704 of FIG. 7), the first communication proxy monitors volume of data packets in the second queue. In some embodiments, a flow signal (i.e., first control signal in FIG. 8) is sent to the second communication proxy to stop transmitting the data packet after the first communication proxy determines that the volume of the data packets in the second queue is greater than a preset threshold.

In some embodiments, after the second communication proxy receives the first control signal, it stops transmitting the data packet to the first communication proxy. The first communication proxy continues to transmit the data packets that are in the first queue, and then the volume of data packets in the second queue gradually falls. After sending the first control signal to the second communication proxy, the first communication proxy monitors the volume of the data packets in the second queue. A second control signal (i.e., second control signal in FIG. 8) is sent to the second communication proxy to resume transmitting the data packets after the first communication determines that the volume of the data packets in the second queue falls within a preset threshold.

In some embodiments, the first application in the first server may send a corresponding flow control signal to the first communication proxy to slow down the data reception rate. In addition to proactively monitoring the volume of data packets in the second queue, the first communication proxy may determine whether a flow control signal is sent by the first application via a pre-established inter-process communication connection between the first communication proxy and the first application. Once the first communication proxy determines the flow control indicating to stop transmitting data packets, the first communication proxy temporarily stops transmitting, for example, all the data packets in the second queue.

In some embodiments, after the first communication proxy stops transmitting data packets in the second queue, the first communication proxy receives a flow control signal to resume the transmitting data packets via the pre-established inter-process communication connection between the first communication proxy and the first application. Upon receiving the flow control signal, the first communication proxy resumes transmitting, for example, all the data packets in the second queue.

In some embodiments, in the process of executing blocks 701-704, the first communication proxy may receive a broadcast message from the second server where the second communication proxy is located. The broadcast message indicates that the second application in the second server is terminated. The first communication proxy may send the received broadcast message to applications in the first server. Accordingly when the second application is determined, space occupied in the data connection by its corresponding second queue can also be released to avoid wasting resources.

Figure 9:
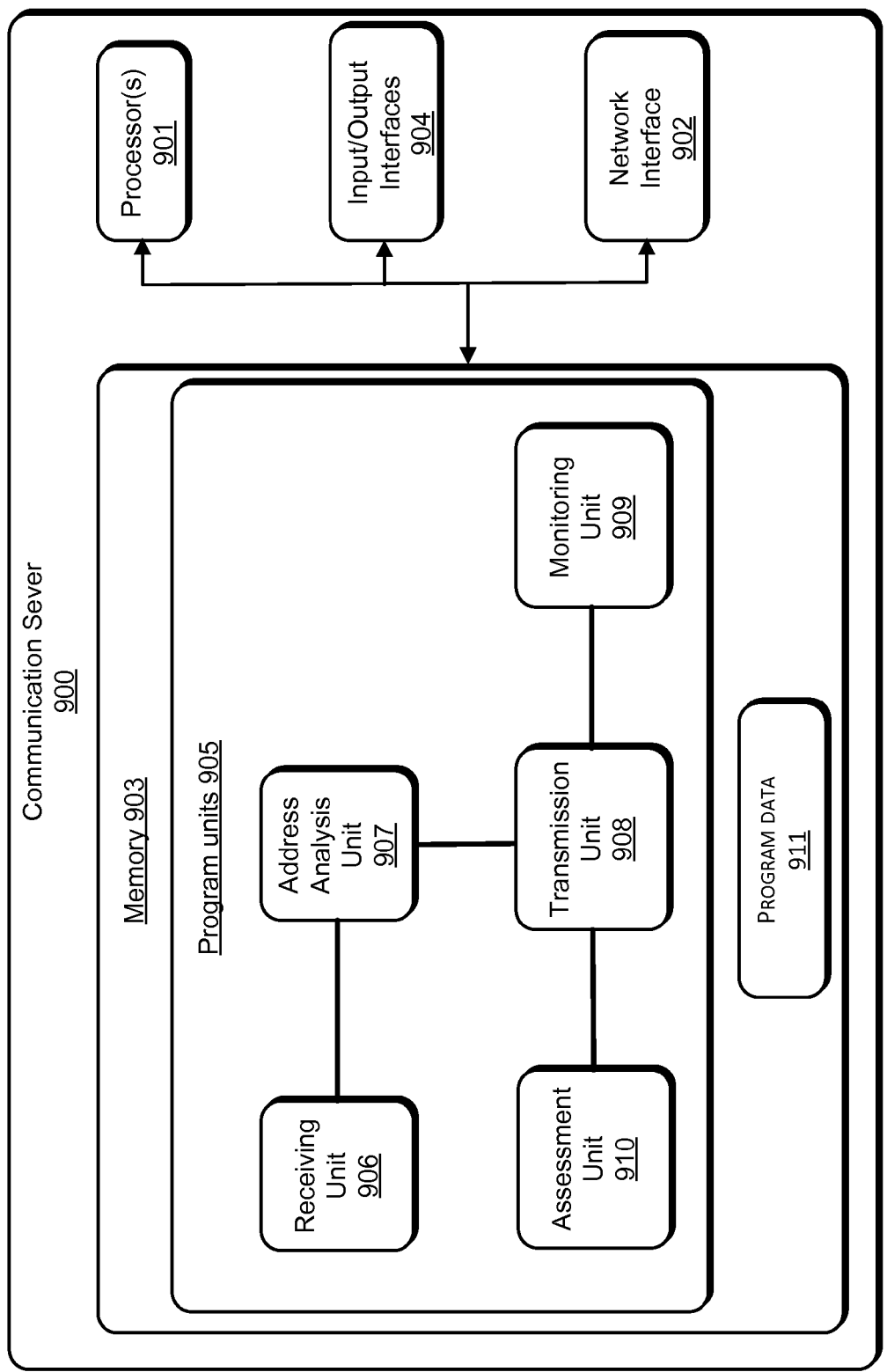
FIG. 9 is a schematic block diagram showing details of an exemplary TCP communication server.
Figure 10:
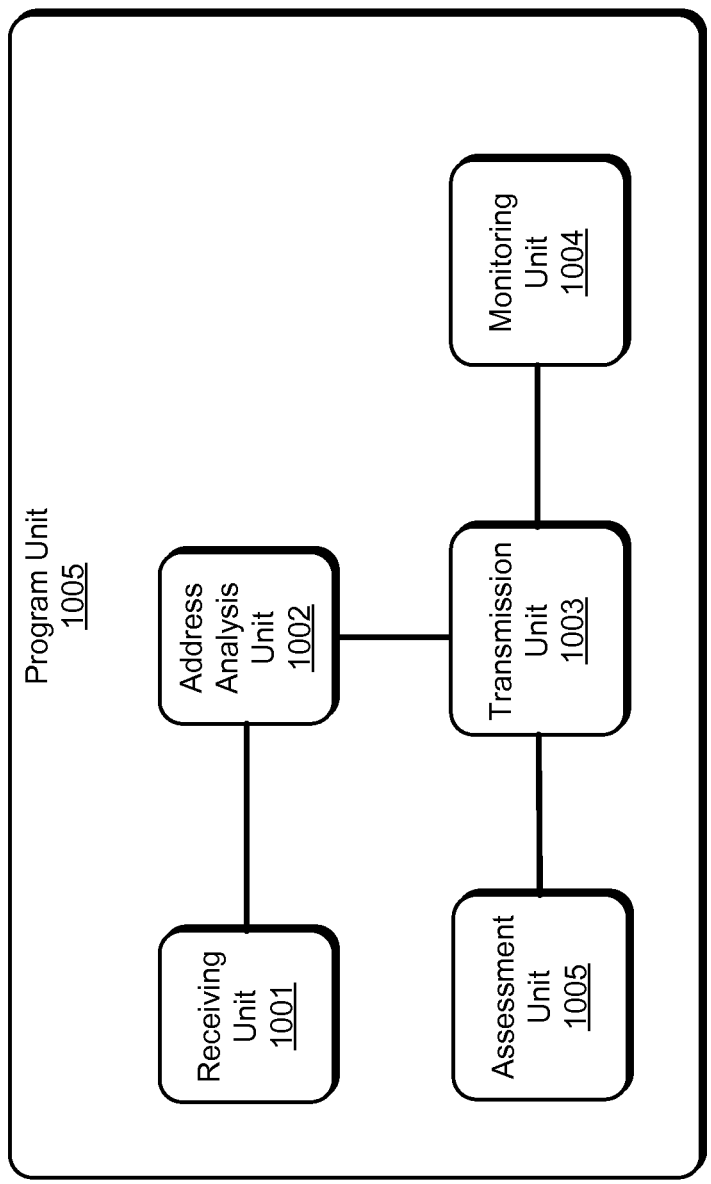
FIG. 10 is a schematic block diagram showing details of an exemplary program unit of a TCP communication server.

FIG. 9 and FIG. 10 are block diagrams showing exemplary servers for TCP communications. For discussion purpose, the servers are described with reference to the processes shown in FIGS. 3, 5 and 6-8, a data packet format in FIG. 4, and TCP connections in FIG. 2. However, the servers may perform different processes involving different data packet formats and connections.

In some embodiments, the servers have built-in two-way communication functionality. As a result, data packets may be transmitted by a first application in a first server to a second communication proxy, and data packets may also be transmitted by the second communication proxy to the first application in the first server. Also for discussion purpose, the sections below first describes a server with functional modules that transmit data packets from the first application to the second communication proxy, and the functional modules that transmit the data packets from the second communication to the first application.

FIG. 9 is a schematic block diagram showing details of an exemplary TCP communication server 900. The communication server 900 may be configured as any suitable system. In one exemplary configuration, the communication server 900 includes one or more processors 901, network interface 902, input/output interfaces 904, and memory 903.

The memory 903 may include computer-readable media in the form of volatile memory, such as random-access memory (RAM) and/or non-volatile memory, such as read only memory (ROM) or flash RAM. The memory 903 is an example of computer-readable media.

Computer-readable media includes volatile and non-volatile, removable and non-removable media implemented in any method or technology for storage of information such as computer readable instructions, data structures, program modules, or other data. Examples of computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable media does not include transitory media such as modulated data signals and carrier waves.

The memory 903 may include program units 905 and program data 911. In some embodiments, the program units 905 may include a receiving unit 906, an address analysis unit 907, a transmission unit 908, a monitoring unit 909 and an assessment unit 910.

In some embodiments, the receiving unit 901 receives the data packet from the first application in the first server. For example, the receiving unit 901 receives data packets transmitted by the first application via the pre-established inter-process communication connection between the first communication proxy and the first application.

The address analysis unit 902 may analyze a destination address in the data packet, and determine the address of the second server that the second application that receives the data packet is located on.

The transmission unit 903 may place the data packet in the corresponding queue between the first communication proxy and the second communication proxy, and transmit the data packet to the second communication proxy via a pre-established data connection between the first communication proxy and the second communication proxy. For example, the data packet may be retrieved using a first-in-first-out technology from the queue when the data connection falls within bandwidth requirements. Then, the data packet is transmitted to the second communication proxy via the data connection.

In some embodiments, the monitoring unit 904 may monitor the volume of data packets in the queue, when the transmission unit 903 transmits the data packets. If the volume is greater than or equal to a predefined first threshold, the monitoring unit 904 sends a first control signal to the first application to stop transmitting the data packet. When the monitoring unit 904 determines that the volume of the data packets falls within a predefined second threshold, it sends a second control signal to the first application to resume transmitting the data packet.

In some embodiments, the assessment unit 905 may determine whether a third control signal is sent from the second communication proxy to stop transmitting data packets via the pre-established control connection between the first communication proxy and the second communication proxy. If the assessment unit 905 determines that such the third control signal exits, it temporarily stops transmitting, for example, all the data packets from the queue. Upon receiving from the control connection between the first communication proxy and the second communication proxy a fourth control signal indicating to resume transmitting data packets, the assessment unit 905 resumes transmitting, for example, all the data packets.

In some embodiments, when determining that the first application is terminated, the transmission unit 903 may send a broadcast message to indicate second communication proxies that have established data connection with the first communication proxy.

FIG. 10 is a schematic block diagram showing details of an exemplary program unit 1000 of a TCP communication server. The program unit 1000 may include a receiving unit 1001, an address analysis unit 1002, a transmission unit 1003, a monitoring unit 1004 and an assessment unit 1005.

The receiving unit 1001 receives the second communication proxy's transmitted data packet from the second application in the second server via a pre-established data connection between the first communication proxy and the second communication proxy;

The address analysis unit 1002 may analyze the destination address in the data packet received from the receiving unit 901, and determine the address of the first application.

The transmission unit 1003 may place the received data packet in a second queue between the first communication proxy and the first application, and send the data packet to the first application via the pre-established inter-process communication connection between the first communication proxy and the first application.

In some embodiments, the transmission unit 1003 may retrieve the data packet from the second queue using a first-in-first-out technique when the inter-process communication connection between the first communication proxy and the first application satisfies bandwidth requirements. The transmission unit 1003 may send the data packet to the first application using the inter-process communication connection between the first communication proxy and the first application.

In some embodiments, the monitoring unit 1004 monitors the volume of the data packets in the second value, when the transmission unit 1003 transmits the data packet to the first application via the inter-process communication connection between the first communication proxy and the first application. When the volume of the data packets is greater than or equal to a defined first threshold, the monitoring unit 1004 sends the first control signal to the second communication proxy to stop transmitting the data packet via the pre-established control connection between the first communication proxy and the second communication proxy. When the volume of the data packets falls within a second predefined threshold, the monitoring unit 1004 sends a second control signal to the second communication proxy to resume transmitting the data packet via the pre-established control connection between the first communication proxy and the second communication proxy.

In some embodiments, the assessment Unit 1005 determines a third control signal indicating to stop transmitting the data packets via the pre-established inter-process communication connection, when the transmission unit 1003 sends the data packets to the first application via the pre-established inter-process communication connection between the first communication proxy and the first application. When the assessment unit 1005 determines that the third control signal is received, the transmission unit 1003 temporarily stops transmitting, for example, all the data packets from the second queue.

In some embodiments, the assessment unit 1005 determines a fourth control signal indicating resuming transmitting all the data packets via the pre-established inter-process communication process. After the eighth control signal is received, the transmission unit 103 resumes transmitting, for example, all data packets in the second queue.

In some embodiments, the receiving unit 1001 may receive from the second server a broadcast message that the second application is terminated. Upon receiving, by the receiving unit 1001, the broadcast message, the transmission unit 1003 may send the broadcast message received to first applications in the server (e.g., A-D in FIG. 2).

For discussion purposes, any number of the described blocks in FIG. 9 and FIG. 10 can be combined in any order and/or in parallel to implement the processes described above. For example, function modules can contain a receiving unit including 901 and 1001, an address analysis unit including 902 and 1002, a transmission unit including 903 and 1003, a monitoring unit including 904 and 1004 and an assessment unit including 905 and 1005.

This disclosure provides transmission control protocols and the servers enabling all applications in a first server and all applications in a second server to exchange data via a data connection between the first communication proxy and second communication proxy.

The disclosure also provides a data communication channel between a first application in the first server and a second application in the second server via the established data connection between the first communication proxy and second communication. Compared to conventional technologies under which many TCP connections need to be established between TCP communication parties, the TCP communication protocols and the servers provided by the disclosure greatly reduces the actual number of connections between the first applications and the second applications, and effectively conserves system resources maintaining TCP connections. In addition, because the data connection is stable, it prevents delays caused by frequent connections and disconnections between two applications that occur under the conventional technologies. Therefore, the TCP communication protocols and the servers provided by the disclosure also increase communication efficiency.

Moreover, the TCP communication protocols and the servers provided by the disclosure enable simultaneously establishing a control connection between the first communication proxy and second communication proxy. In the control connection, flow control signals are transmitted to ensure that the data transmission flow does not exceed the allowable range and that transmission of data packets is reliable between the first application and second application.

A person having ordinary skill in the art would be able to make changes and alterations to embodiments provided in this disclosure. Any changes and alterations that persons with ordinary skill in the art would appreciate fall within the scope of this disclosure.

What is claimed is:

1. A computer-implemented method of Transmission Control Protocol (TCP) communications, the method comprising:

receiving a data packet that is sent from a first application on a first server and designated to a second application on a second server;

analyzing the data packet to determine a destination address associated with the second server;

placing, based on the destination address, the data packet in a queue located between a first communication proxy on the first server and a second communication proxy on the second server and corresponding to the second application; and transmitting the data packet to the second communication proxy via a pre-established data connection between the first communication proxy and the second communication proxy, wherein the data packet comprises a source field and a destination field, the source field including a first two-tuple that includes a first Internet Protocol (IP) address and a first unique application ID associated with the first application, the destination field including a second two-tuple that includes a second IP address and a second unique application ID associated with the second application.

2. The computer-implemented method of claim 1, wherein the data packet further comprises data packet priority, and placing the data packet in the queue comprises placing the data packet in the queue based on the data packet priority.

3. The computer-implemented method of claim 1, wherein the receiving of the data packet comprises receiving the data packet via a pre-established inter-process communication connection between the first communication proxy and the first application.

4. The computer-implemented method of claim 1, further comprising:
    determining that the pre-established data connection satisfies a bandwidth requirement; and
    retrieving the data packet from the queue based on a first-in-first-out technique.

5. The computer-implemented method of claim 1, further comprising:
    determining that a volume of data packets retrieved from the queue exceeds a first pre-configured threshold; and
    subsequently sending a first control signal to the first application to terminate the transmitting of the data packet.

6. The computer-implemented method of claim 5, further comprising:
    determining that the volume of the data packets retrieved from the queue falls within a second pre-configured threshold; and
    sending a second control signal to the first application to resume the transmitting of the data packet.

7. The computer-implemented method of claim 1, further comprising:
    receiving a first control signal from the second communication proxy, the first control signal indicating termination of transmitting of data packets; and
    terminating the transmitting of the data packets in the queue.

8. The computer-implemented method of claim 7, further comprising:
    receiving a second control signal from the second communication proxy, the second control signal indicating resumption of the transmitting of the data packets; and
    resuming the transmitting of the data packets in the queue.

9. The computer-implemented method of claim 1, further comprising:
    determining that the first application is terminated; and
    sending a broadcast message to one or more communication proxies that are connected to the first communication proxy, the broadcast message indicating that the first application is terminated.

10. A computer-implemented method of transmission control protocol (TCP) communications, the method comprising:
    receiving, by a first communication proxy on a first server, a data packet from a second application on a second server via a pre-established data connection between the first communication proxy and a second communication proxy on the second server, the data packet including a destination address associated with a first application on the first server;
    determining, by the first communication proxy, the destination address;
    placing, by the first communication proxy, the data packet in a queue between the first communication proxy and the first application based on the destination address;
    transmitting, by the first communication proxy, the data packet to the first application via a pre-established inter-process communication connection between the first communication proxy and the first application;
    determining, by the first communication proxy, that a volume of data packets retrieved from the queue exceeds a first pre-configured threshold;
    subsequently sending a first control signal to the second communication proxy via the pre-established data connection to terminate the transmitting of the data packets;
    determining that the volume of the data packets retrieved from the queue falls within a second pre-configured threshold, the second pre-configured threshold being lower than the first pre-configured threshold; and
    subsequently sending a second control signal to the second communication proxy to resume the transmitting of the data packets.

11. The computer-implemented method of claim 10, further comprising:
    determining that the pre-established data connection satisfies a bandwidth requirement; and
    retrieving the data packet from the queue based on a first-in-first-out technique.

12. The computer-implemented method of claim 10, further comprising:
    receiving a third control signal via the pre-established inter-process communication connection, the third control signal indicating termination of transmitting of one or more data packets to the second communication proxy; and
    terminating the transmitting of the one or more data packets in the queue to the second communication proxy.

13. The computer-implemented method of claim 12, further comprising:
    receiving a fourth control signal via the pre-established inter-process communication connection, the fourth control signal indicating resumption of the transmitting of the one or more data packets; and
    resuming the transmitting of the one or more data packets in the queue to the second communication proxy.

14. The computer-implemented method of claim 10, further comprising:
    determining, by the first communication proxy, that the second application is terminated; and
    sending, by the first communication proxy, a broadcast message to applications that are connected to the first communication proxy and on the first server, the broadcast message indicating that the second application is terminated.

15. A system for Transmission Control Protocol (TCP) communications, the system comprising:
    memory;
    one or more processors;
    a receiving unit, stored in the memory and executable by the one or more processors, to receive a data packet from a first application on a first server, the data packet including a destination address associated with a second server including a second application to which the data packet is designated;
    an address analysis unit, stored in the memory and executable by the one or more processor processors, to determine the destination address;
    a transmission unit, stored in the memory and executable by the one or more processors, to:
        place, based on the destination address, the data packet in a queue located between a first communication proxy on the first server and a second communication proxy on the second server and corresponding to the second application; and transmit the data packet to the second communication proxy via a pre-established data connection between the first communication proxy and the second communication proxy; and a monitoring unit, stored in the memory and executable by the one or more processors, to:
- determine that a volume of data packets retrieved from the queue exceeds a first pre-configured threshold;
- subsequently send a first control signal to the second communication proxy via the pre-established data connection to terminate the transmitting of the data packets;
- determine that the volume of the data packets retrieved from the queue falls within a second pre-configured threshold, the second pre-configured threshold being lower than the first pre-configured threshold; and
- subsequently send a second control signal to second communication proxy to resume the transmitting of the data packets.

16. A system for Transmission Control Protocol (TCP) communications, the system comprising:

memory;

one or more processors;

a receiving unit, stored in the memory and executable by the one or more processors, to receive a data packet from a second application on a second server via a pre-established data connection between a first communication proxy on a first server and a second communication proxy on the second server, the data packet being designated to a first application on the first server;

an address analysis unit, stored in the memory and executable by the one or more processors, to analyze the data packet to determine a destination address associated with the first application;

a transmission unit, stored in the memory and executable by the one or more processors, to:
- place the data packet in a queue between the first communication proxy and the first application on the first server based on the destination address; and
- transmit the data packet to the first application via a pre-established inter-process communication connection between the first communication proxy and the first application; and a monitoring unit, stored in the memory and executable by the one or more processors, to:
- determine that a volume of data packets retrieved from the queue exceeds a first pre-configured threshold;
- subsequently send a first control signal to the second communication proxy via the pre-established data connection to terminate the transmitting of the data packets;
- determine that the volume of the data packets retrieved from the queue falls within a second pre-configured threshold, the second pre-configured threshold being lower than the first pre-configured threshold; and
- subsequently send a second control signal to second communication proxy to resume the transmitting of the data packets.

* * * * *